United States Patent
Kim et al.

(10) Patent No.: US 8,475,080 B2
(45) Date of Patent: Jul. 2, 2013

(54) METHOD FOR REMEDIATING ARSENIC-CONTAMINATED SOIL

(75) Inventors: Jae-Gon Kim, Daejeon (KR);
Jung-Hwa Lee, Daejeon (KR);
Yong-Chan Cho, Daejeon (KR);
Joo-Sung Ahn, Daejeon (KR);
Choon-Oh Lee, Daejeon (KR);
Ho-Cheol Song, Daejeon (KR)

(73) Assignee: Korea Institute of Geoscience and Mineral Resources (Kigam), Daejeon (KR)

( * ) Notice: Subject to any disclaimer, the term of this patent is extended or adjusted under 35 U.S.C. 154(b) by 351 days.

(21) Appl. No.: 12/940,385

(22) Filed: Nov. 5, 2010

(65) Prior Publication Data
US 2012/0045284 A1    Feb. 23, 2012

(30) Foreign Application Priority Data
Aug. 20, 2010 (KR) .................. 10-2010-0080800

(51) Int. Cl.
*B09C 1/02* (2006.01)

(52) U.S. Cl.
USPC ............ 405/128.75; 588/407; 588/313

(58) Field of Classification Search
USPC ............ 405/128.1, 128.75; 588/313, 407
See application file for complete search history.

(56) References Cited

U.S. PATENT DOCUMENTS

| | | | |
|---|---|---|---|
| 5,397,478 A | * | 3/1995 | Pal et al. ............... 210/710 |
| 5,769,961 A | * | 6/1998 | Peters et al. ............ 134/25.1 |
| 6,251,258 B1 | * | 6/2001 | Kojima et al. ........... 205/702 |

FOREIGN PATENT DOCUMENTS

JP    2004-89954 A  *  3/2004

OTHER PUBLICATIONS

Memoirs of the Faculty of Engineering, Kyushu University, vol. 68, No. 2, Jun. 2008 Influence of Redox Potential on Arsenic Release from Soil in the Presence of Iron Oxyhydroxide by Nguyen, et al. Kim Phuong Nguyen†, Ryuichi Itoi and Rie.*

* cited by examiner

*Primary Examiner* — John Kreck
(74) *Attorney, Agent, or Firm* — Ladas & Parry LLP (57) ABSTRACT

Provided is a method for remediating arsenic-contaminated soil, including: a collection step of collecting arsenic-contaminated soil; a washing step of adding the collected soil to a washing solution, which is acidic in nature and provides reducing conditions to the soil, so as to remove arsenic from the soil and transfer the removed arsenic to the washing solution; a solid-liquid separation step of separating the soil and the washing solution from each other after the washing step; and a post-treatment step of removing arsenic from the washing solution, which was separated in the solid-liquid separation step, and employing the soil for remediation.

12 Claims, 5 Drawing Sheets

| WASHING SOLUTION | 0.0N HCl | | 0.001N HCl | | 0.01N HCl | | 0.05N HCl | | 0.1N HCl | |
|---|---|---|---|---|---|---|---|---|---|---|
| | 0% dith. | 0.5% dith. | 0% dith. | 0.5% dith. | 0% dith. | 2% dith. | 0% dith. | 1.5% dith. | 0% dith. | 2% dith. |
| FINAL pH | 5.72 | 6.56 | 5.35 | 6.54 | 3.22 | 5.83 | 1.53 | 5.06 | 1.16 | 3.67 |
| FINAL Eh (mV) | 292 | −400 | 206 | −409 | 342 | −367 | 472 | −288 | 713 | −236 |
| AS CONCENTRATION OF SOIL AFTER WASHING (mg/kg) | 45.1 | 36.6 | 44.9 | 24.4 | 44.7 | 19.0 | 43.4 | 17.4 | 44.1 | 26.1 |

FIG. 7

| ARSENIC CONCENTRATION OF ORIGINAL SOIL (mg/kg) | ARSENIC CONCENTRATION AFTER WASHING (mg/kg) | WASHING SOLUTION BEFORE WATER TREATMENT | | | ARSENIC CONCENTRATION OF WASHING SOLUTION AFTER WATER TREATMENT (mg/L) |
|---|---|---|---|---|---|
| | | Eh (mV) | pH | ARSENIC CONCENTRATION (mg/L) | |
| 45.1 | 19.2 | -258 | 5.83 | 4.16 | 0.76 |

METHOD FOR REMEDIATING ARSENIC-CONTAMINATED SOIL

CROSS-REFERENCE TO RELATED APPLICATION

This application claims priority to and the benefit of Korean Patent Application No 2010-0080800. filed on 20 Aug. 2010, the disclosure of which is incorporated herein by reference in its entirety.

BACKGROUND OF THE INVENTION

1. Field of the Invention

The present invention relates to a method for remediating contaminated soil, and more particularly, to a method for remediating arsenic-contaminated soil by separating arsenic from arsenic-contaminated soil and treating the separated arsenic.

2. Description of Related Art

Soil contamination results from various causes, including waste dumping, hazardous chemical leakage, the use of agricultural chemicals and fertilizers, and incineration. Soil contamination not only causes various problems, including the disturbance of the soil ecosystem, the contamination of crops, and the absorption of contaminants into the human body, but also acts as a contamination source that causes secondary contamination of surface water, underground water and the atmosphere. Also, soil contamination is more chronic than air and water pollution, and thus requires much time and cost for remediation.

In Korea, the Soil Environment Conservation Act was established and became effective on the basis of recognition of adverse effects of soil contamination on humans and the ecosystem. In the Soil Environment Conservation Act, criteria for 16 items (Cd, Cu, As, Hg, Pb, $Cr^{6+}$, Zn, Ni, F, organic phosphorus compounds, CN, BTEX, TPH, TCE, and PCE) are established and controlled.

Soil contaminated with arsenic among the above 16 items has been remediated by various processes, including solidification, and stabilization by microorganisms and chemicals. In the solidification and stabilization processes, arsenic present in soil is modified into a form of low toxicity and mobility.

In Korea, an arsenic extraction method that uses 1 N HCl was used to measure the degree of arsenic contamination, but was replaced by an extraction method, which uses aqua regia, according to the revision of the Soil Contamination Process Test Method revised in 2009. Namely, in the existing extraction method that uses 1 N HCl, an arsenic type of high in vivo toxicity is mainly extracted, and whether or not the amount of arsenic extracted exceeds the criterion is determined. However, in the new extraction method using aqua regia, all types of arsenic present in soil are extracted, and whether or not the amount of arsenic extracted exceeds the criterion is determined. Thus, when the contaminated soil is remediated using the existing stabilization and solidification process, it is difficult to satisfy the criterion if the newly revised the Soil Contamination Process Test Method is applied. Namely, in the existing stabilization process, the removal rate of arsenic from soil is low, and thus when arsenic is extracted from the remediated soil, a large amount of arsenic is extracted.

Meanwhile, when a washing process using an acidic solution is applied to soil contaminated with arsenic, arsenic in a relatively unstable form (a water-soluble form, an adsorbed form or a carbonate form) can be extracted, but the extraction of arsenic in a relatively stable crystalline iron oxide form or residual form is limited.

Also, in washing of arsenic-contaminated soil with an acidic solution, there are frequent cases in which released arsenic ions are adsorbed to positively charged iron oxide in an acidic environment to increase rather than decrease the degree of contamination.

Namely, when arsenic-contaminated soil is washed with an acidic solution, arsenic that has been co-precipitated with iron oxide or manganese oxide is released while being negatively charged. In this case, because the surface of iron oxide or manganese oxide is positively charged in an acidic environment, the released arsenic ions are adsorbed again to iron oxide or manganese oxide, thus reducing the efficiency of arsenic removal.

Accordingly, it is expected that, when the conventional soil washing process that uses an acidic washing solution is applied to a soil contaminated with a high concentration of arsenic, the remediation of the soil will be difficult to achieve. Therefore, it is required to develop a new process which can overcome the limitation of this conventional process.

SUMMARY OF THE INVENTION

The present invention has been made in order to solve the above-described problems occurring in the prior art, and it is an object of the present invention to provide a method capable of remediating arsenic-contaminated soil in a highly economical and efficient manner.

According to one aspect of the present invention, there is provided a method for remediating arsenic-contaminated soil, the method including: a collection step of collecting arsenic-contaminated soil; a washing step of adding the collected soil to a washing solution, which is acidic in nature and provides reducing conditions to the soil, so as to remove arsenic from the soil and transfer the removed arsenic to the washing solution; a solid-liquid separation step of separating the soil and the washing solution from each other after the washing step; and a post-treatment step of treating the washing solution and the soil, which were separated in the solid-liquid separation step.

In the present invention, arsenic is separated and removed from a first type of arsenic contaminant with which arsenic was co-precipitated, a second type of arsenic contaminant to which arsenic was electrically adsorbed, and a third type of arsenic contaminant which consists of arsenic and metal compounds.

The washing solution that is used in the washing step may contain a reducing agent, in which the reducing agent may be sodium dithionite.

The washing solution may have a pH of 5.5-7.5 and an oxidation-reduction potential (Eh) of −100 to −400 mV at a time point when the washing of the soil is completed.

The post-treatment step may include adding an oxidizing agent to the washing solution, separated in the solid-liquid separation step, to precipitate arsenic, and then subjecting the washing solution to solid-liquid separation to remove arsenic, in which the oxidizing agent may be hydrogen peroxide.

The post-treatment step may include adding calcium chloride dihydrate ($CaCl_2 \cdot 2H_2O$) together with an oxidizing agent to the washing solution to precipitate arsenic and adding a cationic flocculant to the washing solution.

The washing solution may be prepared by mixing a 0.01 N aqueous solution of hydrochloric acid with 2% sodium dithionite.

BRIEF DESCRIPTION OF THE DRAWINGS

The above and other objects, features and advantages of the present invention will become more apparent to those of ordinary skill in the art by describing in detail preferred embodiments thereof with reference to the attached drawings in which.

DETAILED DESCRIPTION OF THE INVENTION

Hereinafter, a method for remediating arsenic-contaminated soil according to one embodiment of the present invention will be described in further detail with reference to the accompanying drawings in detail.

Figure 1:
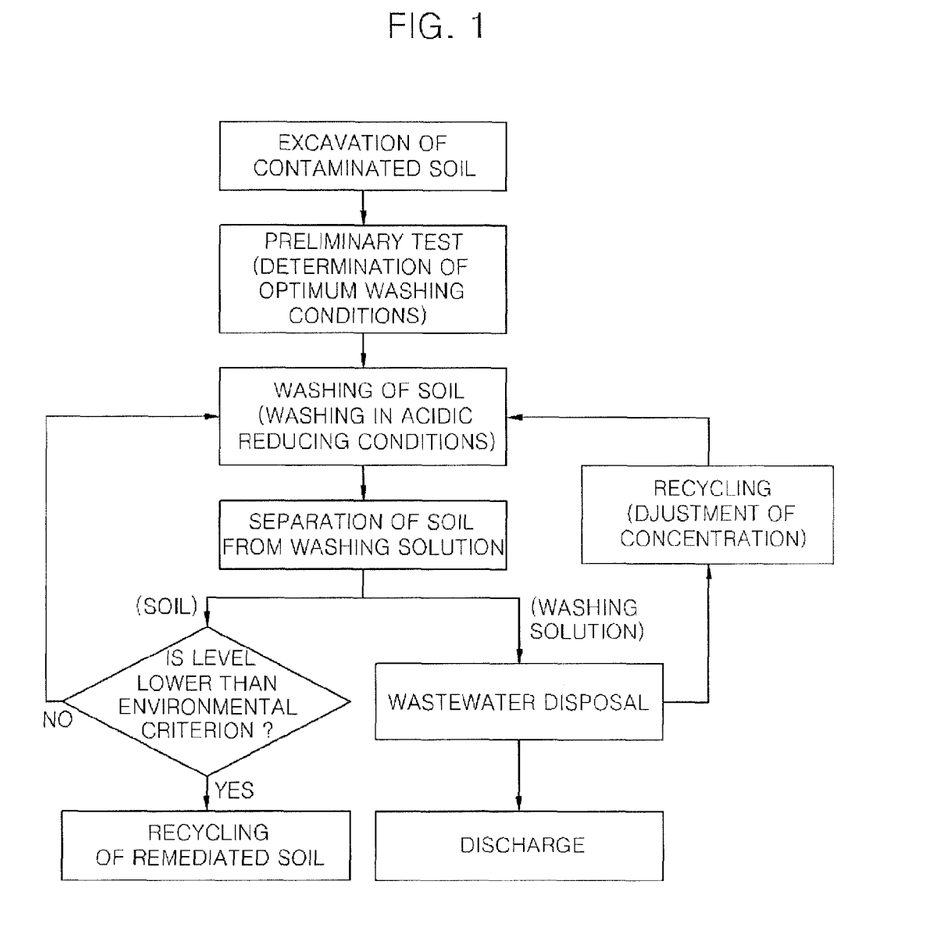
FIG. 1 is a schematic flow chart showing a method for remediating arsenic-contaminated soil according to one embodiment of the present invention.

FIG. 1 is a schematic flow chart showing a method for remediating arsenic-contaminated soil according to one embodiment of the present invention.

Referring to FIG. 1, in the method for remediating arsenic-contaminated soil according to one embodiment of the present invention, soil contaminated with soil is collected. Herein, the soil is mainly collected by excavating soil in an area to be remediated, to a given depth.

Arsenic is known as a hazardous element that causes cancer. Arsenic is present in a trivalent ($AsO_3^{3-}$) or pentavalent ($AsO_4^{3-}$) state in soil. Trivalent arsenic is predominant in the soil in a reducing environment, and pentavalent arsenic is predominant in the soil in an oxidizing environment. Also, arsenic is present in ionic and solid states in soil.

In the case of solid-state arsenic, trivalent arsenic stable in a reducing environment is present mainly in the form of sulfide mineral, and pentavalent arsenic stable in an oxidizing environment is frequently present as co-precipitates with iron oxide and manganese oxide. Most soils excluding special soil such as wet land soil have an oxidizing environment, and arsenic in the soil mainly forms anionic complexes. Thus, arsenic in the soil is generally present in a state in which it is adsorbed on iron oxide having a positively charged surface or is present as co-precipitates with iron oxide and manganese oxide.

Soil minerals known to have a small particle size, a large surface area and high chemical activity include mineral clay, iron oxide and manganese oxide. The surface of mineral clay has permanent negative charges, and thus the adsorption of arsenic ions thereto is limited. However, the surfaces of iron oxide and manganese oxide have variable charges which change according to pH. Thus, arsenic is electrically adsorbed to iron oxide and manganese oxide which have surface positive charges at a pH lower than the point of zero charge (PZC).

In the case of solid-state arsenic, iron-arsenic and manganese-arsenic compounds, including $FeAsO_4$, $Fe_3(AsO_4)_2$ and $Mn_3(AsO_4)_2$, are most frequent in the soil in an oxidizing environment, and arsenic sulfides, including AsS, As2S2 and As2S3, are predominant in the soil in a reducing environment. Also, $Fe(AsO2)_2$ and $Ca(AsO2)_2$ are produced in a weakly reducing environment. In most soils excluding a wet land soil having a strongly reducing environment, solid-state arsenic forms iron and manganese compounds. Among these, the iron-arsenic compound is known as the most frequent solid-state arsenic.

In the present invention, for the convenience of description, arsenic is classified, according to the form in which arsenic exists, into three types: a first type of arsenic contaminant with which arsenic was co-precipitated; a second type of arsenic contaminant to which arsenic was electrically adsorbed; and a third type of arsenic contaminant which forms compounds with arsenic.

The first type of arsenic contaminant is mainly an iron oxide mineral or manganese oxide mineral with which arsenic was co-precipitated, the second type of arsenic contaminant is an iron oxide mineral or manganese oxide mineral to which arsenic was adsorbed, and the third type of arsenic contaminant is a compound of arsenic with a metal such as iron, aluminum or calcium.

In order to remove arsenic from the first to three types of arsenic contaminants, the arsenic contaminants are first dissolved to release arsenic ions. Namely, when iron oxide or manganese oxide with which arsenic was co-precipitated or to which arsenic was adsorbed is dissolved, arsenic ions are released together with iron ions or manganese ions. Also, when arsenic is dissolved together with iron compounds or aluminum compounds, arsenic ions are released together with metal ions.

As a washing solution for dissolving the first to third types of arsenic contaminants, an acid is used. Referring to the pH-Eh diagrams of iron oxide mineral and manganese oxide mineral shown in FIGS. 2 and 3, it can be seen that the solubility of the arsenic contaminant increases with an increase in the intensity (pH) of acid.

However, if the first to three types of arsenic contaminants are dissolved using a strong acid, two problems arise. One problem is a problem associated with economic efficiency and post-treatment. If a small amount of strong acid is used at a laboratory scale, economic efficiency is not greatly influenced; however, actual soil remediation is performed in a large scale, and thus the use of strong acid is avoided in consideration of economic efficiency. Also, if strong acid is used as the washing solution, the post-treatment cost will undesirably increase.

The other problem is associated with the efficiency of arsenic removal. Namely, the PZC of manganese oxide corresponds to a pH of 2-4, and the average PZC of iron oxide corresponds to a pH of 8. Specifically, if the pH of the washing solution is lower than the PZC of iron oxide and manganese oxide, the surface of the oxides will have positive charges, and as the pH of the washing solution decreases, the quantity of the charges increases. The arsenic ions eluded by the acid form anions, and thus as the pH of the washing solution decreases, the released arsenic ions are adsorbed again to the iron oxide mineral or manganese oxide mineral which remain without being dissolved.

Furthermore, if strong acid is used as the washing solution, the solubility of iron oxide and manganese oxide will also increase, iron oxide and manganese oxide which remain without being dissolved will act as very strong adsorbents as the pH of the washing solution decreases. Accordingly, there is a problem in that the eluded arsenic ions are strongly adsorbed again to iron oxide and manganese oxide so that the efficiency of arsenic removal is reduced rather than increased.

On the other hand, if the pH of the washing solution is high, the arsenic ions will not be adsorbed to the iron oxide and manganese oxide that remain, and the already adsorbed arsenic will be desorbed from the iron oxide and the manganese oxide, and thus the removal rate of arsenic from soil will be increased.

Accordingly, it is necessary to adjust the pH of the washing solution so as to dissolve the first to third types of arsenic contaminants while preventing released arsenic ions from being adsorbed again. Particularly, the pH of the washing solution should be higher at a time point when the dissolution reaction is completed than the initial reaction stage, such that the re-adsorption of arsenic ions can be effectively prevented.

Accordingly, in the embodiment of the present invention, a reducing agent is added to the washing solution in order to increase the solubility of the first to third types of arsenic contaminants such as iron oxide or manganese oxide while increasing the final pH of the washing solution at a time point when the reaction is completed.

If the reducing agent is included in the washing solution, the Eh of the washing solution can decrease to increase the solubility of metal oxides, whereby the pH of acid that is used in the washing solution can be set at a relatively high value, and the consumption of hydrogen ions during the dissolution reaction can be promoted, so that the pH of the washing solution at a time point when soil washing is completed can be maintained at a high level. In this embodiment, the final pH of the washing solution can be maintained at about 5.5-7.5.

Figure 2:
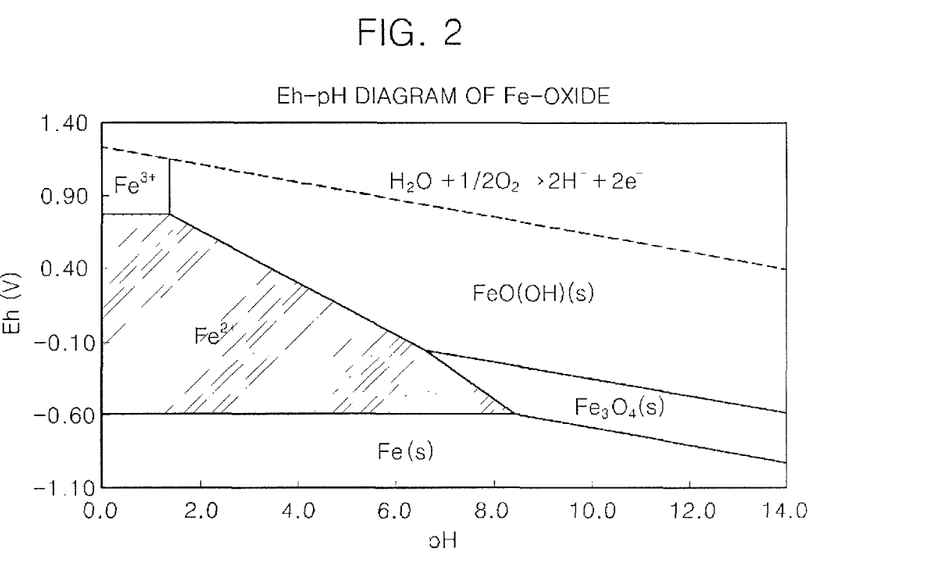
FIG. 2 is a pH-Eh diagram of iron oxide mineral.
Figure 3:
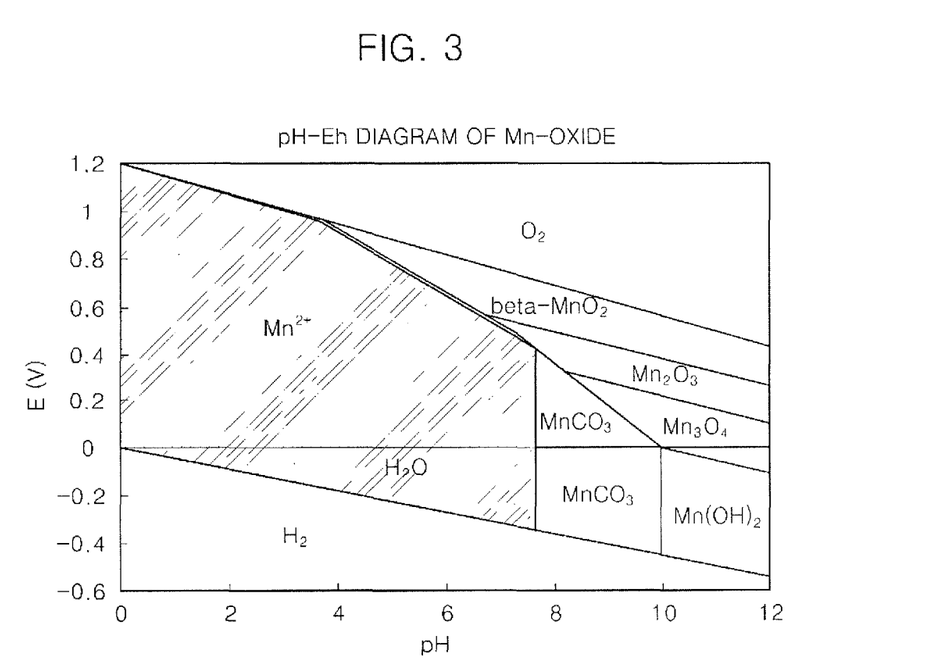
FIG. 3 is a pH-Eh diagram of iron manganese mineral.

As can be seen in the diagrams of FIGS. 2 and 3, the pH and Eh of the washing solution should be low such that iron oxide is dissolved to release iron ions or such that manganese oxide is dissolved to release manganese ions. If the pH of the washing solution is low, arsenic ions will be adsorbed again to iron oxide or manganese oxide which remains without being dissolved, thus reducing the removal rate of arsenic. For this reason, in the embodiment of the present invention, the Eh of the washing solution is reduced instead of decreasing the pH thereof, thereby increasing the solubility of the metal oxides.

As the reducing agent, sodium dithionite (Na2S2O4) having strong reducing power is used. However, various substances may also be used as the reducing agent. Also, when the reducing agent is used, the Eh of the washing solution is reduced while electrons are donated during the dissolution reaction, whereby the consumption of hydrogen ions in the washing solution is promoted to continuously increase the pH of the washing solution.

As described above, the washing solution is prepared using an aqueous solution of hydrochloric acid or nitric acid, and sodium dithionite is added to the washing solution to adjust the pH and Eh of the washing solution.

As the washing solution is prepared, it is added to the excavated arsenic-contaminated soil in the collection step and then stirred. The following dissolution reaction between the arsenic-contaminated soil and the washing solution occurs, whereby arsenic ions are released from the first and second types of manganese oxide and iron oxide.

<Dissolution Reaction of Arsenic Ions from First and Second Types of Manganese Oxide Mineral>

$MnO_2 \cdot AsO_4^{3-}$(adsorption or co-precipitation)$+4H^+-$
$2e^- <- - ->Mn^{2+}+AsO_4^{3-}+2H_2O$ (Equation 1)

<Dissolution Reaction of First and Second Types of Iron Oxide Mineral>

$Fe_3O_4 \cdot AsO_4^{3-}$(adsorption or co-precipitation)$+8H^++$
$2e^- <- - ->3Fe^{2+}+AsO_4^{3-}+4H_2O$ (Equation 2)

In Equations 1 and 2, the first and second types of iron oxides and manganese oxide are dissolved while consuming hydrogen ions, and the oxidation number of iron and manganese decreases so that they are reduced. As hydrogen ions are consumed, the pH of the washing solution gradually increases and is maintained at about 5.5-7.5 as described above at a time point when the reaction is completed. Because the pH of the washing solution is maintained at a relatively high level as described above, there does not occur a problem in that arsenic ions are adsorbed again to the iron oxide or manganese oxide that remains without being dissolved even at a time point when the reaction is completed. Thus, the efficiency of arsenic removal increases.

An arsenic release reaction that occurs through the dissolution of the third type of arsenic contaminants, $AlAsO_4$, $Ca_3(AsO_4)_2$, $FeAsO_4$, $Fe_3(AsO_4)_2$, $Mn_3(AsO_4)_2$ and $Ba_3(AsO_4)_2$, is as follows:

$AlAsO_4^+H^F<- - ->Al^{3+}+HAsO_4^{2-}$ $Ca_3(AsO_4)_2+H^+<- - ->3Ca^{2+}+HAsO_4^{2-}$ $FeAsO_4+H^+<- - ->Fe^{3+}+HAsO_4^{2-}$ $Fe_3(AsO_4)_2+2H^+<- - ->3Fe^{2+}+2HAsO_4^{2-}$ $Mn_3(AsO_4)_2+2H^+<- - ->3Mn^{2+}+HAsO_4^{2-}$ $Ba_3(AsO_4)_2+2H^+<- - ->Ba^{2+}+2HAsO_4^{2-}$

Namely, compounds of arsenic with metal are dissolved in an acidic condition to elude arsenic ions.

As described above, manganese oxide and iron oxide are easily dissolved in a washing solution in an acidic, reducing environment. During the dissolution of manganese oxide and iron oxide, $H^+$ ions are consumed, whereby the pH of the washing solution is increased during the reaction.

It is important to use acid together with the reducing agent. In the case in which only acid is used, a high concentration of strong acid should be used to increase the solubility of arsenic contaminants. In this case, the pH of the washing solution is maintained at a low level as described above, thus causing a problem in that arsenic ions are adsorbed again. If only the reducing agent is used to dissolve arsenic contaminants, the reaction time will be very long and the solubility of the metal oxides will be limited.

In the case in which acid and the reducing agent are used together, two advantages are obtained. First, the Eh of the washing solution is reduced due to the reducing agent to increase the solubility of the arsenic contaminants, and thus the pH of the washing solution can be maintained at a relatively high level from the initial stage.

Second, electrons are donated from the reducing agent as shown in Equations 1 and 2 to promote the dissolution reaction and increase the consumption of hydrogen ions, whereby the pH of the washing solution can be increased during the reaction.

Namely, even in the case in which a relatively strong acid is used at the initial reaction stage, if it is used together with the reducing agent, the final pH of the washing solution can be increased, and thus the problem of re-adsorption of arsenic ions can be solved. For example, when acid is used alone as the washing solution or together with the reducing agent, the final pH of the washing solution is much higher in the case in which the reducing agent is used.

Accordingly, when the washing solution simultaneously satisfies the acidic condition and the reducing condition, an environment most advantageous for the removal of arsenic is obtained.

Figure 4:
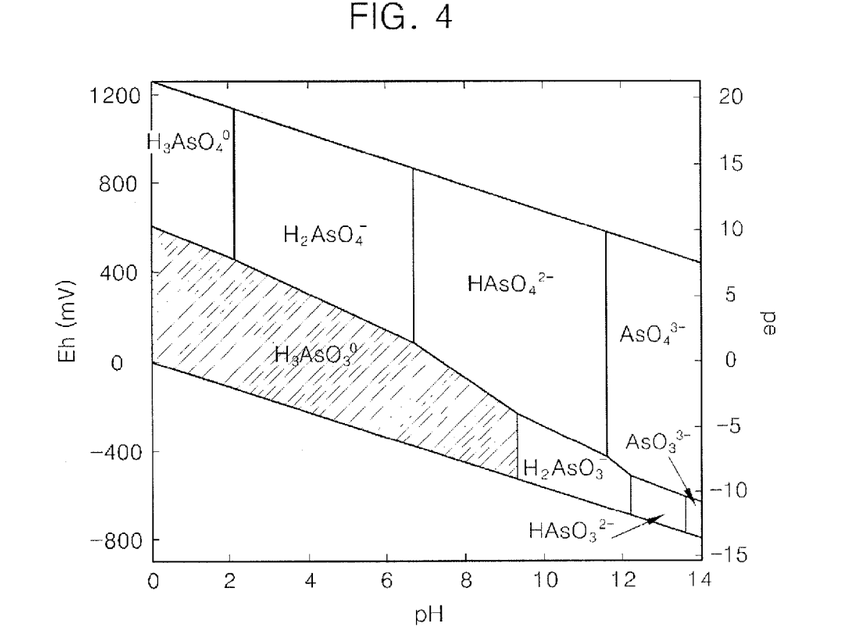
FIG. 4 is a diagram showing the kind of arsenic ion according to the changes in pH and Eh.
Figure 5:
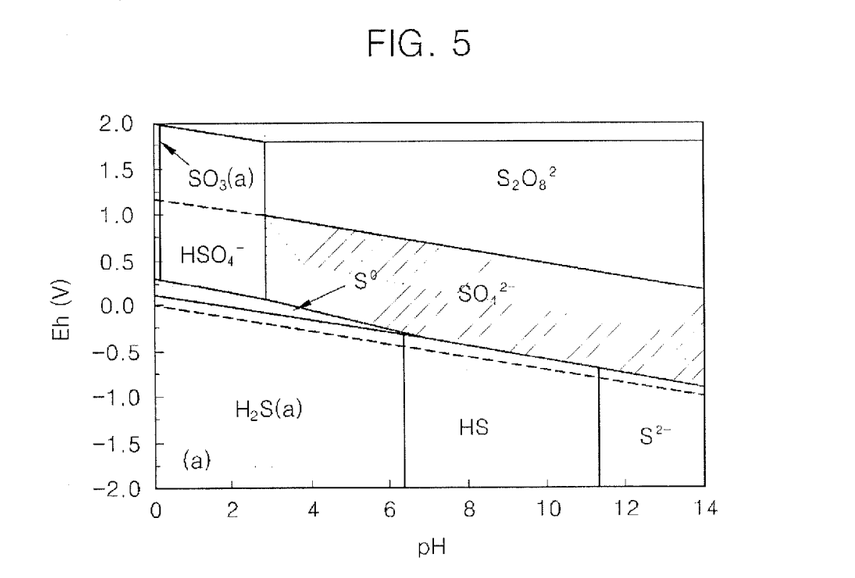
FIG. 5 is a pH-Eh diagram of sulfur.

Meanwhile, as shown in the diagram of FIG. 4, the oxidation-reduction state (trivalent and pentavalent) and the type of ions of arsenic released from arsenic contaminants change according to the change in the pH and Eh of the washing solution, and the degree of adsorption of the released arsenic to soil particles changes according to the type of ions. In order to minimize the adsorption of the released arsenic to soil, the released arsenic is preferably present in a region in the diagram of FIG. 4 in which arsenic has no charges, that is, a stable region of $H_3AsO_3^0$.

In view of the fact that the desorption of arsenic ions from iron oxide and manganese oxide is active at a pH of 6 or more and in consideration of the condition of the stable region in which the released arsenic ions have no charges, the washing solution during the reaction between the washing solution and the soil is preferably maintained at a pH of 5.5-7.5 and an Eh of −100 to −400 mV, and more preferably a pH of 6-7 and an Eh of −200 to −300 mV. If the pH and Eh of the washing solution are lower than the lower limits of the above ranges, the released ions will undesirably be adsorbed again to soil particles, and if they are higher than the upper limits of the above ranges, the solubility of arsenic contaminants will undesirably be reduced.

As described above, arsenic is released from soil by adjusting the pH and Eh of the washing solution using the acid and the reducing agent.

In one embodiment of the present invention, before the remediation of arsenic-contaminated soil is carried out, the optimum conditions of the washing solution are determined through a preliminary step as shown in FIG. 1. Namely, through a preliminary test, the acid and reducing agent concentrations of the washing solution, the ratio of soil to the washing solution, and the reaction time are determined. The optimum conditions can be determined in consideration of release efficiency and economic efficiency by carrying out an arsenic release test in various acid and reducing concentrations, soil/washing solution ratios and reaction times.

It is important in the preliminary step to determine the pH and Eh of the washing solution. Namely, as described above, the pH and Eh of the washing solution should be maintained at given levels at a time point when the dissolution reaction is completed, and thus the initial pH and Eh of the washing solution can be determined by carrying out the preliminary test on the soil to be remediated to examine the degree to which the pH and Eh of the washing solution change during the reaction. If an acid of excessively low pH is used in consideration of solubility, the pH after completion of the reaction cannot be adjusted, and for this reason, the preliminary test is required.

When the washing solution and the soil are stirred to release arsenic as described above, a solid-liquid separation step of separating the washing solution and the soil from each other is carried out. Specifically, the soil particles and the washing solution are separated from each other using a conventional solid-liquid technique such as centrifugation.

Then, the soil and the washing solution, which have been subjected to solid-liquid separation, are subjected to a post-treatment step.

The soil which has been subjected to solid-liquid separation is transferred to the original area from which it was excavated, and the transferred soil is used for soil remediation. However, whether the soil satisfies an environmental criterion is tested. The soils after the washing step mostly satisfy the environmental criterion, but in some cases in which the arsenic concentration is higher than the criterion, the washing step may be carried out again. In this embodiment, whether soil was remediated is determined on the basis of the Soil Contamination Process Test Method.

The post-treatment of the washing solution which has been subjected to solid-liquid separation is carried out in order to remove arsenic from the washing solution. In the embodiment of the present invention, an oxidizing agent is added to the washing solution after solid-liquid separation to remove arsenic, and hydrogen peroxide is used as the oxidizing agent.

Specifically, when the oxidizing agent is added to the washing solution to form an oxidizing environment, the divalent iron ion $Fe^{2+}$ is oxidized to $Fe^{3+}$ easy to precipitate, and the divalent manganese ion $Mn^{2+}$ is oxidized to the tetravalent manganese ion $Mn^{4+}$ easy to precipitate, so that they are precipitated in a form with which arsenic was co-precipitated or to which arsenic was adsorbed, such as the first or second type of arsenic contaminant. The equation of the reaction is as follows:

$$3Fe^{2+}+AsO_4^{3-}+4H_2O_2\text{- - ->}Fe_3O_4\cdot AsO_4^{3-}\text{(adsorption or co-precipitation)}+8H^++2O_2$$

The adsorption or co-precipitation reaction by manganese ions is as follows:

$$Mn^{2+}+AsO_4^{3-}+2H_2O_2\text{- - ->}MnO_2\cdot AsO_4^{3-}\text{(adsorption or co-precipitation)}+4H^++O_2$$

If a precipitate occurs in the form of iron oxide or manganese oxide as shown in the above reaction equation, arsenic ions are adsorbed to the precipitate so that the removal of arsenic is accelerated.

Also, an oxidizing environment is formed in the washing solution, whereby dithionite ($S_2O_4^{2-}$) and sulfite ($SO_3^{2-}$) in the washing solution are oxidized to $SO_4^{2-}$. The equation of the reaction is as follows:

$$S_2O_4^{2-}+3H_2O_2\text{- - ->}2SO_4^{2-}+2H^++2H_2O$$

$$SO_3^{2-}+H_2O_2\text{- - ->}SO_4^{2-}+H_2O$$

Also, if calcium chloride or calcium chloride dihydrate ($CaCl_2\cdot 2H_2O$) is added together with hydrogen peroxide, calcium sulfate dihydrate ($CaSO_4\cdot 2H_2O$) will be precipitated while the decomposition of dithionite and sulfite will be promoted. Then, the time for forming the oxidizing environment will be shortened to accelerate the precipitation reaction, and $Ca_3(AsO_4)_2$ will be produced and precipitated. The equation of the reaction is as follows:

$$Ca^{2+}+SO_4^{2-}+2H_2O\text{- - ->}CaSO_4\cdot 2H_2O$$

$$2Ca^{2+}+3AsO_4^{3-}\text{- - ->}Ca_3(AsO_4)_2$$

Iron oxide, arsenic compounds, and calcium sulfate dihydrate ($CaSO_4\cdot 2H_2O$), produced during the arsenic removal process, have a very small particle size, and thus are difficult to recover through solid-liquid separation. To solve this problem, when a cationic flocculant is added during the post-treatment of the washing solution, aggregates will be produced by the coagulation of the particles such that they can be easily separated by solid-liquid separation.

Also, the added cationic flocculant has the effect of removing arsenic from the washing solution by adsorbing arsenic anions to the aggregates. Solid-liquid separation after the use of the flocculant may be performed using a conventional solid-liquid separation method such as centrifugation.

Meanwhile, the washing solution in which the concentration of $SO_4^{2-}$ was reduced due to the production of calcium sulfate dihydrate ($CaSO_4\cdot 2H_2O$) during the post-treatment of the washing solution is advantageously reused. The washing solution can be reused in the washing step by adjusting the pH of the washing solution with hydrochloric acid, nitric acid or sodium hydroxide and adjusting the Eh of the washing solution with the reducing agent.

Figure 6:
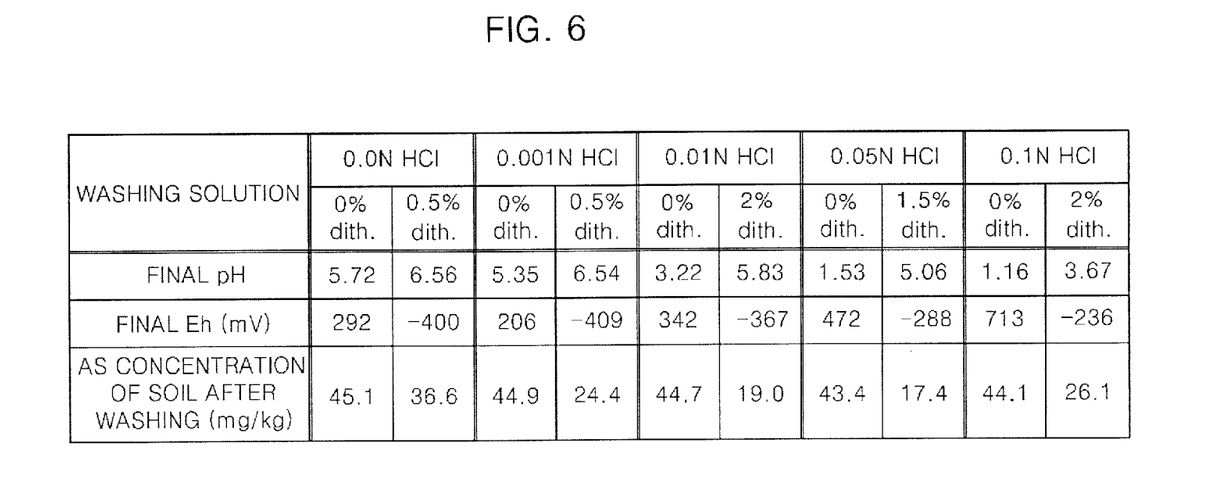
FIG. 6 is a table showing the results of a preliminary test for determining a washing solution.
Figure 7:
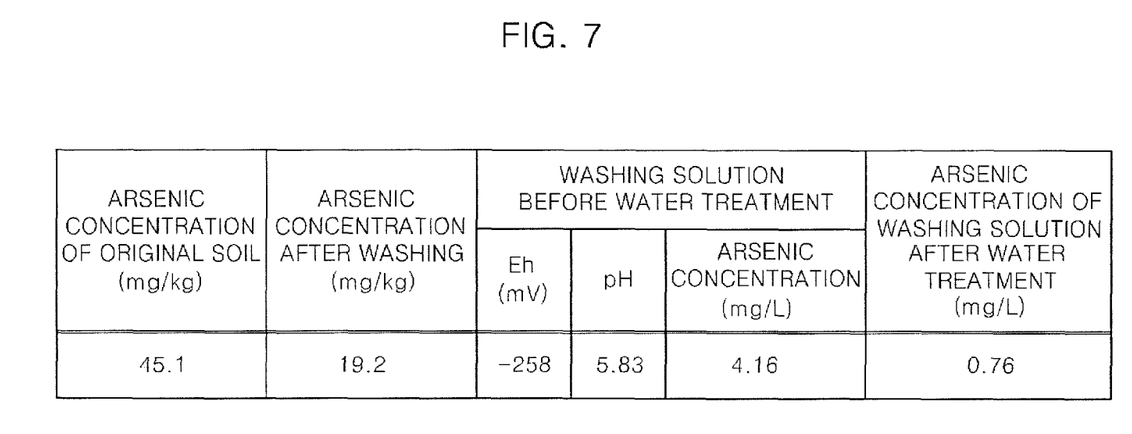
FIG. 7 is a table showing the results of testing one embodiment of the present invention.

The method for remediating arsenic-contaminated soil according to the embodiment of the present invention was tested. The results of the test are shown in FIGS. 6 and 7. FIG. 6 is a table showing the results of a preliminary test for determining a washing solution, and FIG. 7 is a table showing the results of testing one embodiment of the present invention.

First, a soil sample was collected and analyzed. Specifically, arsenic-contaminated soil was collected around a Janghang Smelter (Korea), dried indoors, mildly crushed using a rubber stopper, and then screened through a standard wire sieve to collect a sample having a particle size of 2 mm or smaller. Aqua regia was used to extract arsenic from the sample having a particle size of 2 mm or smaller, and the arsenic concentration of the extract was measured using ICP-AES.

In order to obtain an optimum washing solution, a preliminary test was carried out on the soil sample collected around the Janghang Smelter. As shown in FIG. 6, each of washing solutions containing 0-0.1 N HCl and 0-5% Na-dithionite was allowed to react with the contaminated soil at a mass ratio of 4:1 for 30 minutes. Then, the washing solution and the soil were separated from each other using a centrifuge, and a test for determining an optimum washing solution was carried out.

Arsenic was extracted from the separated soil using aqua regia, and the arsenic concentration of the extract was measured using ICP-AES. Just after the mixing of the washing solution and the soil and 30 minutes after the reaction, the Eh and pH of the washing solution were measured. The optimum conditions selected were the conditions of the washing solution in which the residual arsenic concentration after washing was lower than the criterion while the added acid and Na-dithionite were consumed in small amounts.

The washing solution determined to be suitable in the above preliminary test was a washing solution containing 2% Na-dithionite in a 0.01 N aqueous solution of hydrochloric acid.

As can be seen in the table of FIG. 6, when the washing solution consisted only of acid without sodium dithionite, the final arsenic concentration was more than 40 mg/kg which was not substantially different from the soil arsenic concentration (45 mg/kg). The final arsenic concentration was not greatly influenced by the change in the concentration of the acid. Herein, the fact that the final arsenic concentration was not greatly influenced by the change in the concentration of the acid can be interpreted in two ways. Namely, in the case in which the concentration was low, the dissolution of arsenic contaminants was not easy, and thus arsenic could not removed, and in the case in which the concentration was high, the solution was increased, but arsenic was not removed due to the re-adsorption of the released arsenic ions.

Also, in the case in which the acid was used alone and in the case in which the acid was used together with the reducing agent, it can be seen that the final pH after completion of the reaction was much higher in the case in which the reducing agent was used.

Also, if a high concentration of acid is used at the initial stage, the final pH will necessarily be high. Accordingly, the optimum conditions of the initial pH and Eh need to be found through a preliminary test.

The washing solution containing 0.01 N HCl (0.365 g/L) and 2% Na-dithionite, determined in the test for determining the optimum washing solution, was mixed with the contaminated soil at a ratio of 4:1 and stirred for 30 minutes. After the stirring, the soil and the washing solution were separated from each other using a centrifuge. Arsenic was extracted from the separated soil using aqua regia, and the arsenic concentration of the extract was measured using ICP-AES.

Hydrogen peroxide ($H_2O_2$) was added in a small amount at a time such that the Eh of the separated washing solution after soil washing would be 200 mV or higher. The mixture was stirred for 10 minutes. After the stirring, the supernatant was collected and the arsenic, iron and manganese concentrations thereof were measured using ICE-AES. Calcium hydrochloride dihydrate ($CaCl_2.2H_2O$) was added to the washing solution to a weight concentration of 0.4% and stirred for 10 minutes.

Also, a cationic organic flocculant (YANGFLOC C-619P, Eyang Chemical Co., Ltd.) was added to the washing solution to a concentration of 200 mg/L, allowed to react and then centrifuged, and the arsenic concentration of the washing solution was measured.

Referring to the table of Table 7, the results of the arsenic-contaminated soil showed that the arsenic concentration in the soil was decreased from 45.1 mg/kg before washing to 19.2 mg/kg after washing. This is a value satisfying 25 mg/kg or less that is a type-1 area criterion level provided in the Korean Soil Environment Conservation Act. This suggests that contaminated soil can be remediated according to the method of the present invention.

Also, the washing solution which has been subjected to solid-liquid separation after soil washing was treated and, as a result, the arsenic concentration in the washing solution was decreased from 4.16 mg/L to 0.76 mg/L, suggesting that arsenic could be removed through the post-treatment of the washing solution.

As described above, according to the embodiment of the present invention, in order to solve the problem in that, if the pH of the washing solution is decreased in order to increase a solubility of a material containing arsenic in soil, arsenic ions are re-adsorbed to iron oxide and manganese oxide which remain without being dissolved, thus reducing the removal rate of arsenic, the reducing agent is added to the washing solution to reduce the Eh of the washing solution, thereby increasing the solubility of arsenic contaminates while solving the re-adsorption of arsenic ions. This method enables arsenic to be removed from arsenic-contaminated soil in a very simple and reliable manner.

Also, according to the embodiment of the present invention, the oxidizing agent is added to the washing solution, whereby arsenic can be removed from the washing solution by leaching, such that the washing solution can be reused to solve the problem of disposal thereof.

In the embodiment of the present invention, the acidic washing solution containing the reducing agent is used to form acidic reducing conditions, whereby the solubility of arsenic contaminants such as iron oxide or manganese oxide with which arsenic was co-precipitated or to which arsenic was adsorbed can be increased, thereby easily removing arsenic ions from the arsenic contaminants.

Particularly, the pH of the washing solution is maintained at a relatively high level at a time point when soil washing is completed, thus solving the prior problem in that the released arsenic ions are re-adsorbed to the remaining iron oxide or manganese oxide, thereby significantly increasing the removal rate of arsenic.

In addition, arsenic and fine soil particles can be easily removed from the washing solution using an oxidizing agent, calcium chloride dihydrate, a cationic flocculant and the like, and the washing solution may be reused.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for remediating arsenic-contaminated soil, the method comprising:
- a collection step of collecting arsenic-contaminated soil;
- a washing step of adding the collected soil to a washing solution, which is acidic in nature and provides reducing conditions to the soil, so as to remove arsenic from the soil and transfer the removed arsenic to the washing solution;
- a solid-liquid separation step of separating the soil and the washing solution from each other after the washing step; and
- a post-treatment step of treating the washing solution and the soil, which were separated in the solid-liquid separation step, wherein the post-treatment step comprises adding an oxidizing agent, that comprises hydrogen peroxide, to the washing solution separated in the solid-liquid separation step so as to precipitate arsenic, and then subjectinq the washing solution to solid-liquid separation to remove arsenic.

2. The method according to claim 1, wherein the washing solution that is used in the washing step contains a reducing agent.

3. The method according to claim 2, wherein the reducing agent comprises sodium dithionite ($Na_2S_2O_4$).

4. The method according to claim 1, wherein the washing solution has a hydrogen ion concentration (pH) of 5.5-7.5 at a time point of completion of the washing step.

5. The method according to claim 1, wherein the washing solution has an oxidation-reduction potential (Eh) of −100 to −400 mV at a time point of completion of the washing step.

6. The method according to claim 1, wherein the post-treatment comprises recycling the separated soil after the solid-liquid separation step.

7. The method according to claim 6, wherein whether or not the arsenic content of the soil separated in the solid-liquid separation step is lower than a predetermined criterion is tested before recycling, and when the arsenic content is higher than the criterion, the soil is added again to the washing solution.

8. The method according to claim 1, wherein the post-treatment step comprises adding calcium chloride or calcium chloride dihydrate together with the oxidizing agent to the washing solution to precipitate arsenic.

9. The method according to claim 1, wherein the post-treatment step comprises adding a cationic flocculant to the washing solution.

10. The method according to claim 1, wherein the washing solution which was subjected to solid-liquid separation in the post-treatment step is reused in the washing step after re-adjusting the pH and Eh thereof.

11. The method according to claim 1, further comprising, before the washing step, a preliminary step of determining the pH and Eh of the washing solution by collecting arsenic-contaminated soil from an area to be remediated and preliminarily testing the collected soil.

12. A method for remediating arsenic-contaminated soil, comprising:
- a washing step of adding a first type of arsenic contaminant, with which arsenic was co-precipitated, and a second type of arsenic contaminant to which arsenic was electrically adsorbed, to a washing solution in an acidic and reducing conditions, to dissolve the first and second types of arsenic contaminants, thereby releasing arsenic ions, in which the washing solution is maintained at a pH of 5.5-7.5 and an Eh of −200 to −400 mV at a time point when the dissolution is completed, wherein the washing solution is prepared by mixing a 0.01 N aqueous solution of hydrochloric acid with 2% sodium dithionite;
- a solid-liquid separation step of separating the soil and the washing solution from each other after the washing step; and
- a post-treatment step of adding an oxidizing agent to the washing solution, which was separated in the solid-liquid separation step, to modify the arsenic into a form including the first or second type, and removing the arsenic from the washing solution by solid-liquid separation.

* * * * *